Aug. 20, 1935.                    H. O. RODDE                    2,011,983
                                AUTOMOBILE SIGNAL
                              Filed July 30, 1931            2 Sheets-Sheet 1
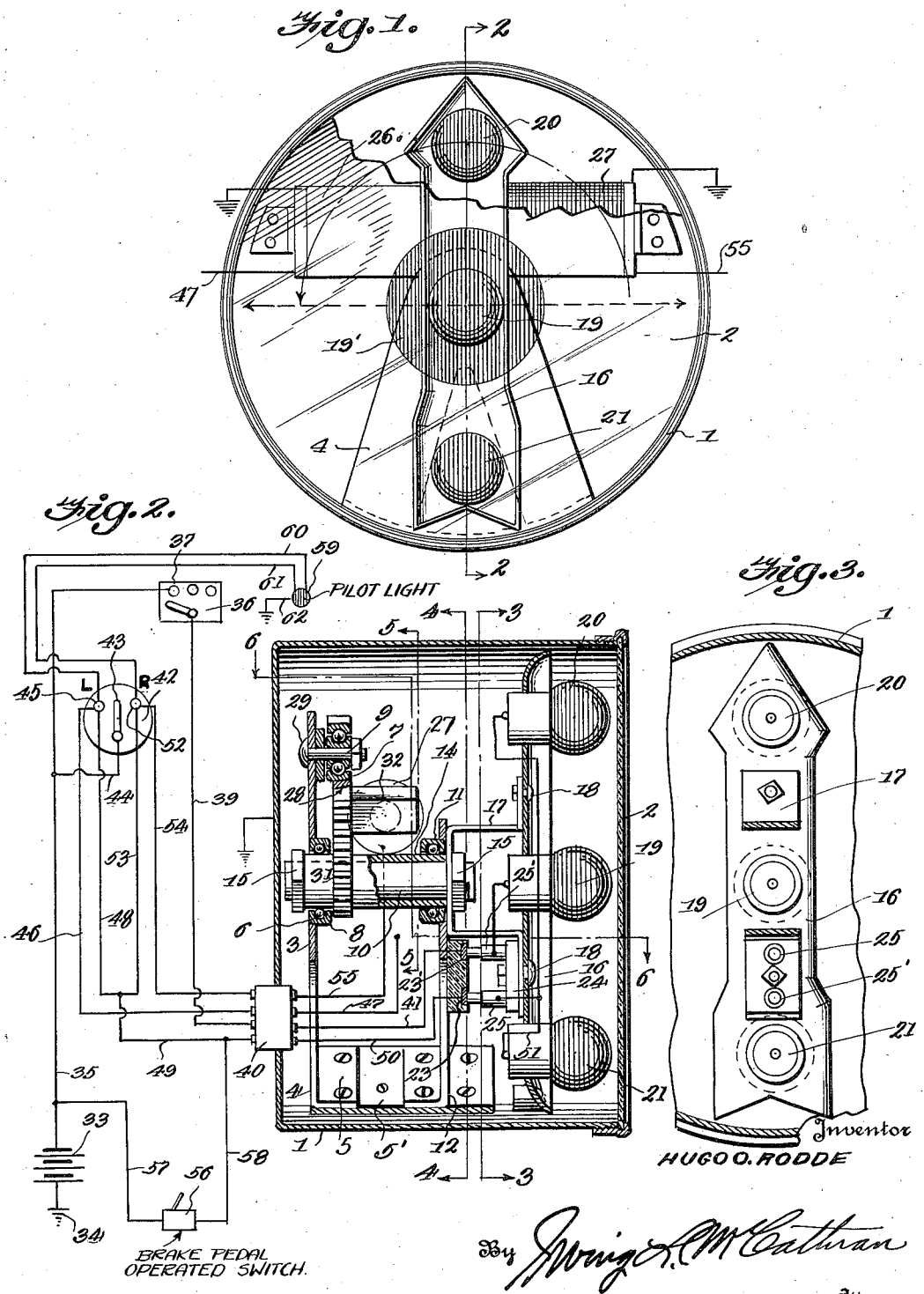
Inventor
HUGO O. RODDE Aug. 20, 1935. H. O. RODDE 2,011,983
AUTOMOBILE SIGNAL
Filed July 30, 1931 2 Sheets-Sheet 2
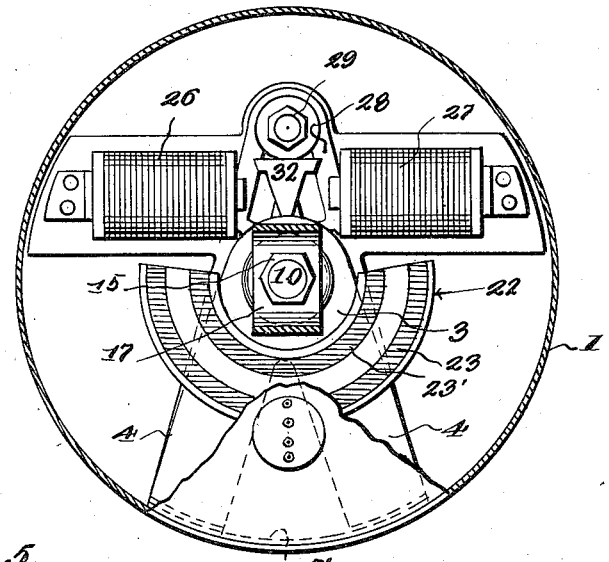
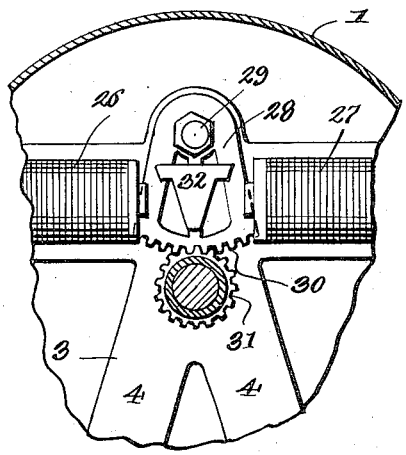
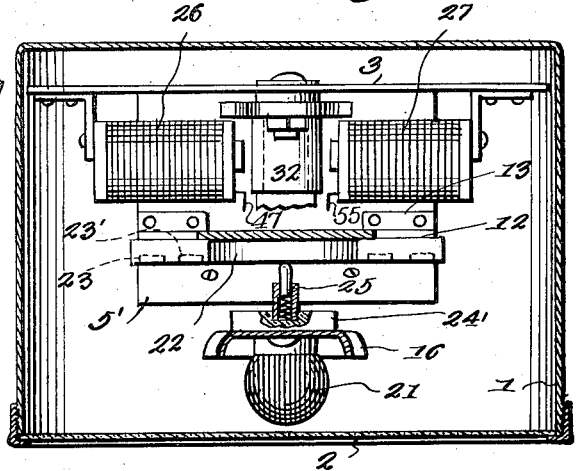
Inventor.
HUGO O. RODDE Patented Aug. 20, 1935

2,011,983

UNITED STATES PATENT OFFICE 2,011,983

AUTOMOBILE SIGNAL

Hugo Otto Rodde, Maywood, Ill.

Application July 30, 1931, Serial No. 554,123

2 Claims. (Cl. 177—327)

This invention relates to a combination stop light, tail light, and turn indicator, and has for its object the production of a simple and efficient signal which is compact in form and contains a stop light, a tail light, and a turn indicator, all of which signals are mounted and designed as to give a clear and comprehensive indication to a following vehicle, of the intended movements of the car upon which the signal may be mounted.

Another object of this invention is the production of a simple and efficient indicating signal, which may be supported in any suitable or desired manner upon a vehicle for the purpose of indicating to a following vehicle the intention of the driver of the car upon which the signal may be mounted.

A still further object of this invention is the production of a simple and efficient means mounted within the casing of the signal for actuating the moving indicating hand.

With these and other objects in view, this invention consists in certain novel constructions, combinations and arrangement of parts, as will be hereinafter more fully described and claimed.

In the drawings:—

Figure 1 is a front elevation of the signal casing, showing the indicator hand positioned therein.

Figure 2 is a section taken on line 2—2 of Figure 1.

Figure 3 is a fragmentary sectional view taken on line 3—3 of Figure 2.

Figure 4 is a section taken on line 4—4 of Figure 2.

Figure 5 is a section taken on line 5—5 of Figure 2.

Figure 6 is a section taken on line 6—6 of Figure 2.

By referring to the drawings it will be seen that 1 designates the casing which is preferably circular in formation, but which may be made in any suitable convenient design, without departing from the spirit of the invention.

The casing 1 has the front end thereof closed by means of a suitable glass lens 2, through which the moving indicating portion of the signal may be very conveniently and readily viewed.

All of the moving parts of the signal are mounted upon a suitable frame which consists of a rear bracket 3, having a plurality of spreading legs 4, which terminate in laterally extending feet 5 for the purpose of securing the rear bracket to the connecting plate 5' which is secured to the casing 1. This bracket 3 carries a bearing ring 6, which ring is preferably pressed into the bracket 3 and welded or otherwise secured thereto to fixedly connect the bearing ring 6 upon the bracket. The bracket 3 also carries a bolt 9 which passes through a bearing ring 7, which bearing ring 7 is pressed into the segmental gear 28 hereafter described.

Within the bearing ring 6 are carried suitable ball bearings 8.

A signal operating shaft 10 is journaled within the bearing ring 6 and contacts with the bearing 8 as shown in Figure 2. The forward end of the signal operating shaft 10 is also journaled in a bearing 11, which bearing 11 is supported by the front bracket 12 mounted within the casing 1, this bracket 12 being similarly constructed to the bracket 3 and having rearwardly extending feet 13, which are secured in any suitable or desired manner to the connecting plate 5'. Upon the shaft 10 is mounted a sleeve 14, which sleeve also extends through the bearings 11 and 6 to facilitate the rotation of the sleeve upon the supporting shaft 10. Suitable nuts 15 are carried by the respective end of the shaft 10 for the purpose of holding the shaft against longitudinal movement through the brackets 3 and 12. The connecting plate 5' may be secured to the inner face of the bottom of the casing 1 by means of screws or other securing means. Due to the fact that the brackets 3 and 12 are carried by the connecting plate 5', the entire mechanism is a unit and may be completely assembled before being set in the casing 1. This structure will also permit the removal of the mechanism for the purpose of repair.

An indicating hand 16 is connected to the shaft 10 by means of a substantially U-shaped bracket 17 which is secured to the rear face of the indicating hand 16, the forward end of the shaft 10 passing through the bracket 17, as clearly illustrated in Figure 2 and being secured thereto firmly by means of the nut 15 carried by the end of the shaft 10 adjacent the indicating hand 16. Suitable bolts 18 are employed for securing the bracket 17 to the indicating hand 16.

The indicating hand 16 is preferably concavo-convex in cross section, as shown in the drawings, to constitute a reflector for the light bulbs carried thereby. The term "hand" as herein used is to be understood as having its usual technical meaning of an indicating pointer without regard to its specific shape although here shown of arrow shape as are frequently the "hands" on clocks and watches. A central lighting bulb 19 is carried by the indicating hand 16 intermediate the ends thereof and lighting bulbs 20 and 21 are carried by the respective ends of the hand as illustrated clearly in Figure 2. The purpose of these lights 20 and 21 being to clearly indicate and permit the hand to be viewed by an approaching vehicle. The outer lens 2 is preferably provided with a centrally located colored portion 19', preferably colored red, this red portion 19' being located in front of the tail light 19. The remaining face of the lens 2 is clear to permit the hand 16 to be easily seen therethrough. The bulbs 19, 20, and 21 are preferably all of the same color for the convenience of replacement.

In order to permit the bulbs to remain lighted throughout the movement of the hand and irrespective of the position of the hand, there is provided a specially constructed contact means in the nature of an insulated segment 22, which is supported upon the bracket 12 and which carries a pair of spaced contact metallic segmental strips 23 and 23', which are connected, as will be described in the following, to a suitable source of electrical supply. The hand 16 carries an insulated block 24 upon the rear face thereof and this block 24 carries a pair of spring pressed contact plugs indicated by the numerals 25 and 25' for contacting with the metallic contacting segmental plates or strips 23 and 23'.

In order to control the operation of the indicating hand 16, there is provided an electrical mechanism consisting of a plurality of magnets, one magnet being indicated by the numeral 26 and the other magnet being indicated by the numeral 27, both magnets being suitably supported upon the bracket 3. The magnets 27 are preferably arranged in alignment, having their attracting poles arranged in opposite relation and spaced from each other as clearly shown in Figures 4, 5 and 6.

A segmental rack 28 is pivotally hung on the bolt 9 upon the upper end of frame 3 and is provided with suitable teeth 30 upon the lower end thereof, which teeth mesh with the gear 31 carried by the sleeve 14, mounted upon the shaft 10. A laterally projecting armature 32 is carried by the segmental rack 28 and extends between the magnetic poles of the magnets 26 and 27, and this armature 32 is adapted to be attracted by the magnets as they are energized, thereby rotating the gear 31 through the swinging of the segmental rack 28, consequently rotating the shaft 10 and sleeve 14 and thereby swinging the arrow or indicating hand 16 in the direction of the arrows indicated in Figure 1, depending upon which of the magnets 26 and 27 is energized. As the segmental rack 13 is pivotally mounted at its upper end it normally hangs in a vertical position between the magnets with the indicating hand disposed vertically as shown in Figure 1, and the indicating hand or pointer will be returned to this position when a magnet is de-energized.

Any suitable or convenient method of wiring the electric connections may be employed, without departing from the spirit of the invention, and it is not desired to limit this particular invention to any particular form of electrical wiring.

For the purpose of illustration it will be seen that a battery 33 grounded at 34 is employed, and a wire 35 passes up to a lamp switch 36, preferably mounted upon the dashboard of a vehicle, which switch 36 is provided with a tail light contact 37. This may be of any suitable or desired construction without departing from the spirit of the invention. A wire 39 passes from the switch 36, down through a suitable connector 40, from which extends a wire 41, to the inner contact plate 23' and this contact plate 23' is engaged by means of the spring pressed plug 25', which plug 25' is connected to the tail light 19, this light being grounded in the usual manner upon the indicating hand 16, and through the casing 1. Therefore the tail light 19 burns continuously when its switch is closed and shows red through the colored portion 19' of the lens 2.

Mounted upon or adjacent the steering wheel is a control switch 42, having a switch arm 43, which is electrically connected to the wire 35, by means of a wire 44. A left contact 45 is mounted upon the switch 42 and to this left contact 44 is connected a wire 46, which passes through the box 40 and connects with a wire 47, passing to the left magnet 26, which magnet is also grounded upon the casing. As the magnet 26 is energized through the closing of the circuit through the medium of the switch arm 43 and the contact 45, the armature 32 will be attracted toward the magnet 26, thereby swinging the segmental plate or gear 28 and rotating the gear 31 in a counter clockwise direction, thereby swinging the indicating hand 16 to a point to the left, during which time the light bulbs 20 and 21 will be illuminated or lighted and by moving with the hand from a vertical position to a diagonal position permit a driver of an approaching vehicle to readily determine the fact that the driver of the vehicle upon which the signal is mounted intends to turn to the left. The current will pass down through the wire 48 from the contact 45, through wire 49, through the box 40 and through the wire 50, to the contact plate 23, to the spring pressed contact plug 25 and through the wire 51, to the bulbs 20 and 21.

As the switch 43 is swung to the right contact with the contact 52, the current will pass down through the wire 53, through the wire 49, through the wire 50, through the plate 23, the plug 25, the wire 51, and to the lights 20 and 21 as the hand is swung to the right. This will also cause the current to pass down through the wire 54, through the box 40, through the wire 55, and up to the magnet 27, which is grounded upon the casing and thereby energizes the magnet 27, this way pulling the armature 52 toward the magnet 27 and rotating the gear 31 in a clockwise direction, swinging the arrow 16 and lights 20 and 21 in a direction to indicate that a right-hand turn is to be made.

The brake pedal actuates a switch 56 which is connected to the wire 35 by means of a wire 57 and this switch 56 is connected to the wire 49 by means of a wire 58. As the brake pedal switch is actuated, the current will pass from the battery 33 through wire 57, through the switch 56, through the wire 58, through the wire 49, through the wire 50, through the contact plate 23, through the plug 25 and to the wire 51, thereby illuminating the bulbs 20 and 21, the hand remaining stationary in a vertical position and the lights serving merely as a warning that the vehicle will slow down or come to a stop without turning to the right or left. The hand only swings when the switch arm 43 is drawn into contact with either the contact 45 or 52.

From the foregoing description it will be seen that a very simple and efficient means has been produced for indicating the direction of travel of a vehicle, carrying the signal, and it also will be seen that a very simple and efficient mechanism has been produced which may very readily and accurately operate the signal to indicate the proper turn which the driver of the machine upon which the signal is mounted is about to make.

It will be further understood that a very simple and efficient mechanism has been produced which may be placed within a single casing, thereby permitting the parts to be easily reached in the event of repairs or replacement. Furthermore, it should be understood that certain detail changes may be made without departing from the spirit of the invention, so long as these changes fall within the scope of the appended claims:—

By considering Figure 2 it will be seen that a pilot light 59 is employed which is in circuit with the contacts 45 and 52 of the switch 42 through the medium of the wires 50 and 61, the pilot light 59 being grounded in the usual way by means of a suitable ground wire 62.

Having described the invention, what I claim as new is:

1. In a signal for vehicles, a casing open at one end, a transparent closure for the open end of said casing, an elongated arrow-shaped indicator having a pivot shaft intermediate its ends rotatably mounted within said casing, an electric lamp at the pivot of said indicator, electric lamps at ends of said indicator, said lamps being in alignment, means for moving said indicator out of vertical position to indicate right and left-hand turns including a set of electromagnets, an armature between said magnets, and a circuit including contact strips, contacts carried by said indicator and engaging the contact strips, one contact being connected with the center lamp and the other contact being connected with the end lamps, a switch connected with one strip for causing the center lamp to be continuously lighted when the switch is closed and serve as a tail light, a double throw switch controlling flow of current to the magnet and second strip for causing both end lamps to be lighted when either magnet is energized to move the indicator in a determined direction, and a brake pedal controlled switch cut into the circuit for controlling flow of current only to the end lamps and causing the end lamps to be lighted with the indicator remaining in a vertical position and together with the center lamp serve as a stop signal when the switch is closed by operating the brake pedal to stop a vehicle.

2. In a signal for vehicles, a casing open at one end, a transparent closure for the open end of said casing, an elongated arrow-shaped indicator having a pivot shaft intermediate its ends rotatably mounted within said casing, an electric lamp at the pivot of said indicator, electric lamps at ends of said indicator, said lamps being placed in alignment, means for moving said indicators out of vertical position to indicate right and left-hand turns including a set of electromagnets, an armature between said magnets, and a circuit having the magnets and lamps incorporated therein and including a switch controlling flow of current to the center lamp independent of the end lamps, a second switch for simultaneously controlling flow of current to the end lamps and a selected one of the magnets to move the indicator in a predetermined direction when the end lamps are lighted, and a brake pedal actuated switch cut into the circuit for controlling flow of current to the end lamps only and causing the end lamps to be lighted with the indicator remaining in the vertical position when brake pedal is applied.

HUGO OTTO RODDE.